United States Patent [19]

McDonald et al.

[11] Patent Number: 5,032,350

[45] Date of Patent: Jul. 16, 1991

[54] SYSTEM FOR INSTALLING A STEAM GENERATOR NOZZLE DAM

[75] Inventors: Francis X. McDonald, Enfield; Eric M. Weisel, Windsor Locks; Glen E. Schukei, South Windsor, all of Conn.

[73] Assignee: Combustion Engineering, Inc., Windsor, Conn.

[21] Appl. No.: 602,395

[22] Filed: Oct. 18, 1990

Related U.S. Application Data

[60] Continuation of Ser. No. 503,809, Apr. 3, 1990, abandoned, which is a division of Ser. No. 285,056, Dec. 15, 1988, Pat. No. 4,954,312.

[51] Int. Cl.$^5$ .............................................. G21C 19/00
[52] U.S. Cl. .................................. 376/260; 376/204
[58] Field of Search ............... 376/260, 204, 203, 277, 376/463; 29/723, 726, 906, 428, 890.031; 165/71, 76, 11.2; 138/89, 93; 277/1, 135; 122/379; 49/506, 477; 220/262, 232, 233

[56] References Cited

U.S. PATENT DOCUMENTS

| | | | |
|---|---|---|---|
| 4,265,011 | 5/1981 | Lebouc | 29/723 |
| 4,482,076 | 11/1984 | Wentzell | 376/204 |
| 4,667,701 | 5/1987 | Evans et al. | 376/204 |
| 4,684,491 | 8/1987 | Rylatt | 376/204 |
| 4,777,008 | 10/1988 | Shirasu | 376/204 |
| 4,782,863 | 11/1988 | Lavalerie et al. | 376/204 |
| 4,860,919 | 8/1989 | Weisel et al. | 376/204 |
| 4,959,192 | 9/1990 | Trundle et al. | 376/260 |

*Primary Examiner*—Daniel D. Wasil
*Attorney, Agent, or Firm*—Chilton, Alix & Van Kirk

[57] ABSTRACT

A system and method for installing a nozzle dam unit (26) in a nuclear steam generator having a head (12) including a head internal surface, a manway (14) penetrating the head, and a nozzle (16) penetrating the head. The system comprises a manipulator (76) adapted to be passed through the manway and having open end (82) adapted to be attached remotely to the head internal surface and a free end including a clamp member (104). A plurality of nozzle dam segments (54, 56, 58) are each sized to pass through the manway and carry means thereon (120) for engaging at least one other segment, the segments when fully engaged to each other forming a dam subassembly sized to pass into and seat against the nozzle. The manipulator is controlled so that the clamp member grasps and supports one of the dam segments within the head until the subassembly is formed within the head, and then is translated within the head until the dam subassembly seats within the nozzle.

7 Claims, 16 Drawing Sheets

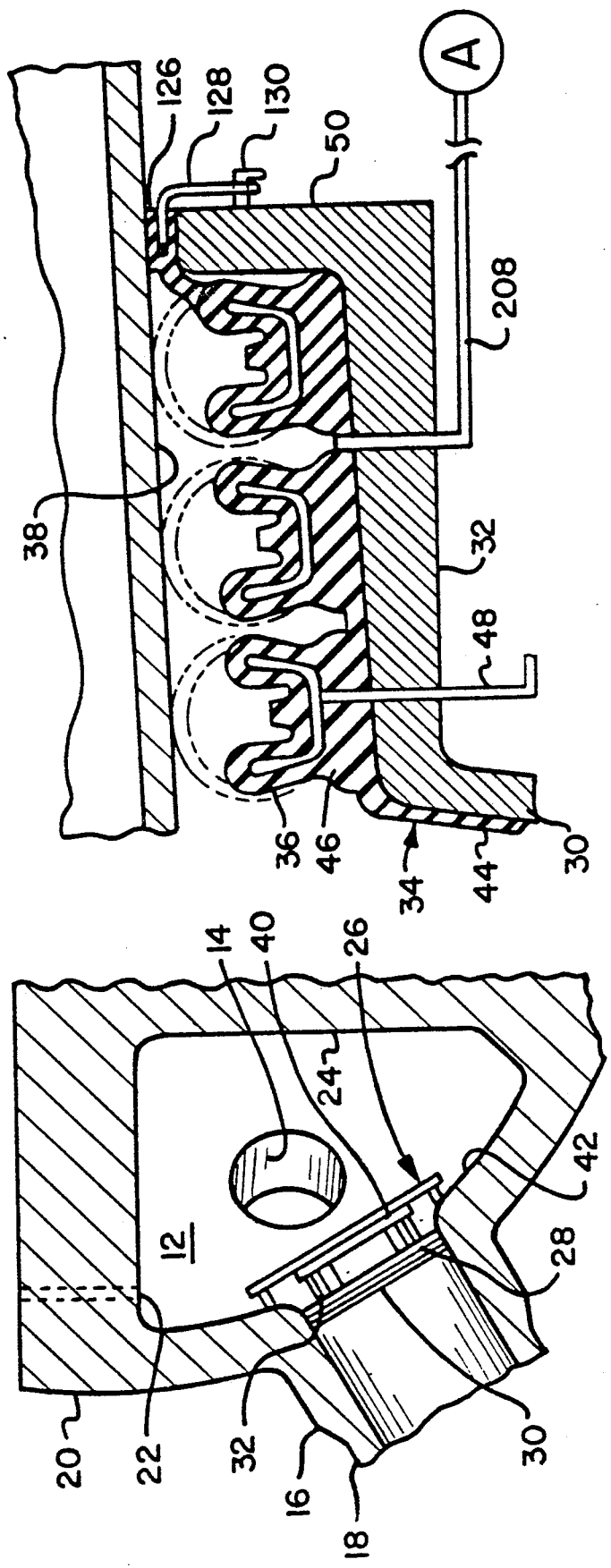

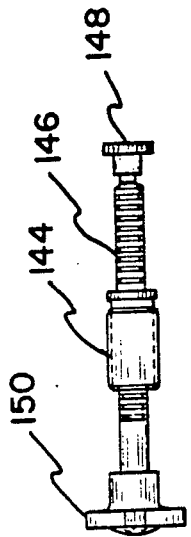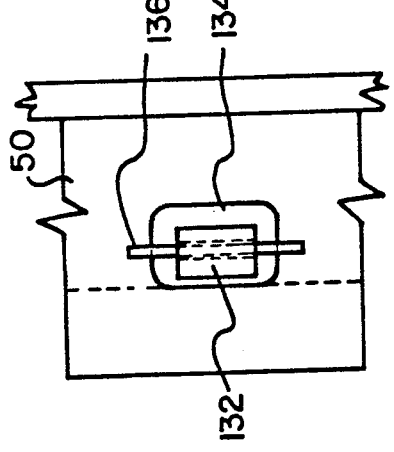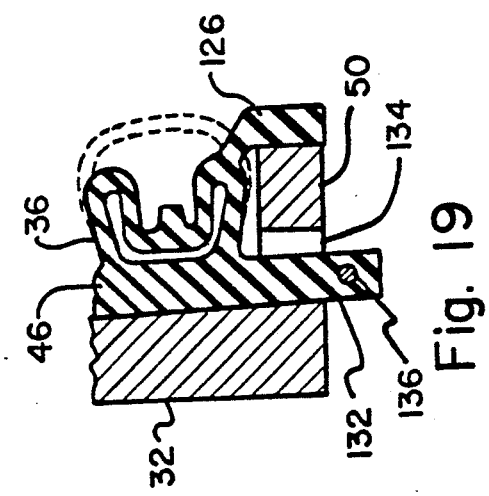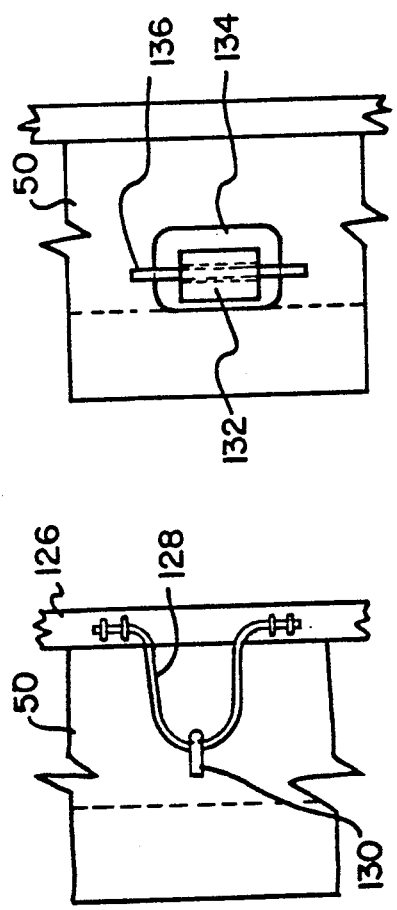

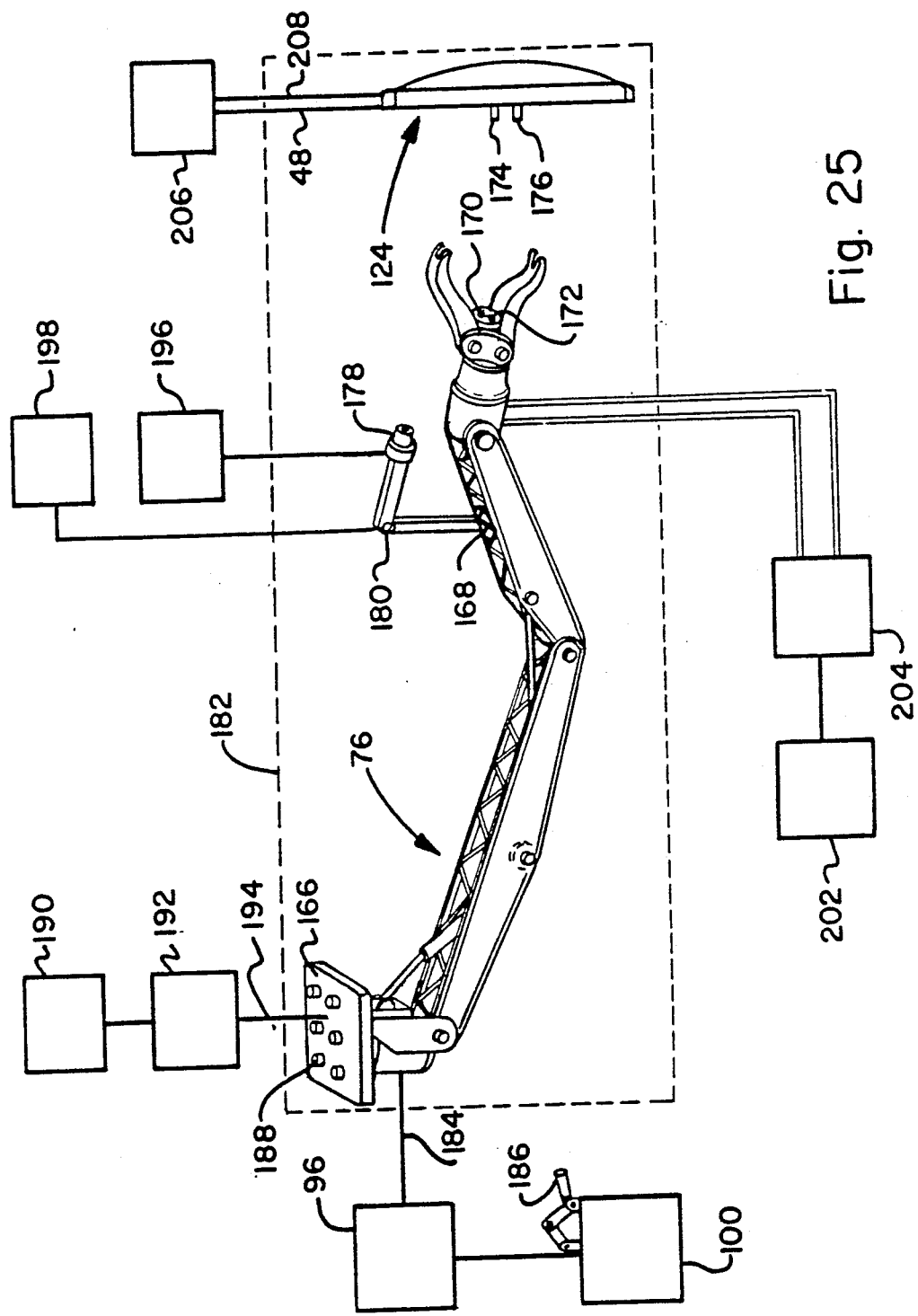

SYSTEM FOR INSTALLING A STEAM GENERATOR NOZZLE DAM

This is a continuation of application Ser. No. 503,809 filed on Apr. 3, 1990, now abandoned, which is a divisional of Ser. No. 285,056 filed Dec. 15, 1988, now U.S. Pat. No. 4,954,312.

BACKGROUND OF THE INVENTION

The present invention relates to the servicing of nuclear steam generators, and more particularly, to the installation of nozzle dams for permitting servicing to proceed within the steam generator while the nuclear reactor core is being refueled or otherwise serviced.

A variety of manually installed nozzle dams have been used in nuclear power plants, such as the type shown in U.S. Pat. No. 4,482,076, "Nozzle Plug For Submersible Vessel", and U.S. Pat. No. 4,483,457 "Hinged Steam Generator Nozzle Plug". These have proven effective in isolating the drained steam generator lower head area from the water in the steam generator hot or cold leg during reactor refueling, and thus have saved considerable time in total plant outage. Nevertheless, the manual installation of these plugs requires that many "jumpers" sequentially enter and exit the steam generator due to the high radiation in the steam generator head, even when drained.

The cost, duration of time, and exposure to radiation of the "jumpers" would be reduced considerably if the nozzle could be installed remotely. This is a difficult task, however, in that the nozzle dam components are heavy, and the space available in the head for maneuvering, is limited.

SUMMARY OF THE INVENTION

It is an object of the present invention to provide an apparatus and method for installing a nozzle dam in a nuclear steam generator, without requiring complete human entry into the steam generator.

This object is accomplished in accordance with the invention, by first installing a manipulator component, such as a multi-axis robot arm, on the tube sheet or other interior support of the steam generator, such that the robot end-effector or jaw has access to the manway and the nozzle in the steam generator head region. The manway diameter is typically smaller than that of the nozzle, so that the nozzle dam and associated supporting structure are manually passed into the steam generator head in component parts and assembled using the manipulator within the head or nozzle. The manipulator itself can be installed on the steam generator tube sheet using a block and tackle from outside the steam generator or by using the manipulator to install itself in conjunction with a support bar across the steam generator manway as a support point. No human entry into the steam generator is required to install the manipulator or the dams, with the exception of arm entries made while passing items through the manway.

The main body of the dam is formed from a plurality of sections or segments, typically three, the center section having a support bar which is grasped by the manipulator jaw as the center section is passed through the manway. The grasped section of the dam is moved to the side of the manway axis to permit a worker outside the manway to slide another dam section onto an edge of the center section, as by a dovetail joint. Spring loaded camlocks or the like prevent the pieces from sliding apart once joined. This subassembly is then moved to the opposite side of the manway axis and another section installed on the grasped section in a similar manner. A flexible seal is wrapped around one face and the circumferential rim of the completed assembly.

The dam assembly with the associated seal is then rotated and displaced as appropriate from the vicinity of the manway into engagement with the inner diameter of the nozzle.

Structural support members to hold the dam assembly against hydraulic pressure, for example support bars or the like for attachment to a permanent support ring on the steam generator walls around the nozzle passage, may be installed sequentially by the manipulator as these structural components are passed through the manway after the assembly is seated in the nozzle. Similarly, locking pins for securing the dam assembly radially against the nozzle inner wall may be actuated remotely.

Positioning of the manipulator, assembling and positioning of the dam, and installation of the support structure can be monitored remotely using T.V. cameras installed in the tube sheet and on the manipulator. If pneumatic or hydraulic actuation of locking pins or other structure associated with the dams is required, supply lines can be provided on the manipulator.

The dam unit is removed in the reverse order of the installation.

The system and method of the present invention considerably reduces the amount of radiation exposure to technicians associated with installing and removing a nozzle dam. A typical rule of thumb is that one man can receive a limit of 2.25 Rem while performing tasks for a given plant outage, and the typical radiation field in the steam generator head would be in the range of 5-25 Rem per hour. For a two-loop plant (having four nozzles), and a radiation field of only 5 Rem per hour, the use of the present invention is estimated to require about three fewer men during a given outage. In a four loop plant (eight nozzles) and a radiation field of 25 Rem per hour, the present invention is estimated to require fifty fewer men.

BRIEF DESCRIPTION OF THE DRAWINGS

These and other objects and advantages of the invention will be more evident from the following description of the preferred embodiment and accompanying drawings in which:

FIG. 1 is a schematic representation of a portion of the lower head of a nuclear steam generator with a single nozzle dam unit installed in the hot leg nozzle in accordance with the present invention;

FIG. 2 is a detailed view of the sealing arrangement between the nozzle dam subassembly and the nozzle inner wall for the arrangement shown in FIG. 1;

FIG. 18 is a schematic representation of the loop and hook arrangement for securing the seal to the dam subassembly shown in FIG. 2;

FIG. 19 is a a schematic view similar to FIG. 2, of another embodiment for securing the seal to the dam subassembly;

FIG. 20 is a schematic representation similar to FIG. 18, for the embodiment of FIG. 19;

FIG. 21 is a schematic of a suitable quick acting screw clamp to serve as a strut member between the dam assembly and the support structure in the embodiment of FIG. 5 and 6;

FIG. 25 is a schematic representation of the complete system of the preferred embodiment of the invention.

DESCRIPTION OF THE PREFERRED EMBODIMENT

Figure 4:
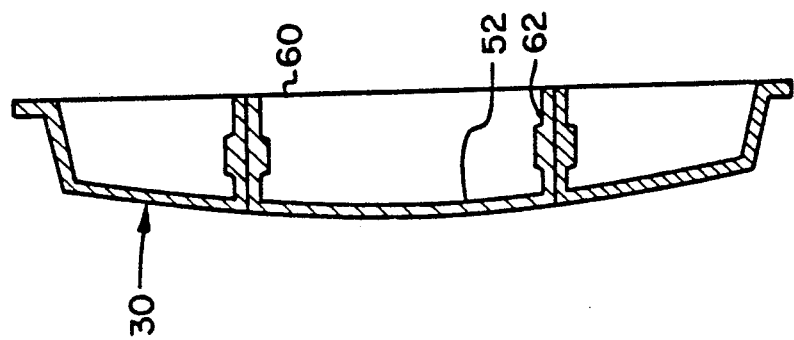
FIG. 4 is a sectioned elevation view through line 4—4 FIG. 3.

FIG. 1 shows a portion of the lower head 12 of a nuclear steam generator, including a substantially circular manway 14 penetration having a first diameter, and a circular or tapered nozzle 16 penetration having a second, larger diameter. The nozzle is connected to a hot or cold leg pipe 18, which contains, during normal operation, a flow of primary coolant from the nuclear reactor vessel into the steam generator. The upper portion of the lower head is defined by a tube sheet 20, consisting of a thick horizontal plate into which are secured a multiplicity of tube ends 22, the tubes extending upwardly through the steam generator. Some steam generators, such as the one shown in FIG. 1, also have a vertical support column 24 substantially centered in the lower head region.

During plant outages, it is often necessary to perform repair or other inspection services on the tubes, and thus the steam generator must be drained so that the servicing equipment can be passed through the manway 14 for attachment to the tubes. This servicing can be performed in parallel with refueling or other servicing associated with the nuclear reactor core, only if the water in the refueling pool, which covers the nuclear core and often extends considerably above the elevation of the nozzle, can be isolated from the steam generator head.

This is accomplished by installing a nozzle dam unit 26 such as is shown in FIGS. 1 and 2, the typical unit consisting of three main parts. The first is a dam subassembly 28, having a generally domed surface. The convex surface 30 faces the nuclear reactor, and the cylindrical perimeter 32 is nearly the same diameter as the cross section of the nozzle in the vicinity of the entry into the steam generator. The second part comprises a generally circular seal member 34 having one or more circumferential, seal tubes 36 for engaging the inner wall 38 of the nozzle. Typically, these seals are inflatable. The third component is a support structure 40 for the dam assembly, connected to a rigid portion of the steam generator such as the inner surface 42 of the head, or, in an alternative embodiment, connected directly to openings in the inner wall of the nozzle itself. These types of dam units are more fully described in U.S. Pat. Nos. 4,482,076 and 4,483,457, the disclosures of which are hereby incorporated by reference.

FIG. 2 shows the details of the interface between the nozzle wall 38 and the seal 34. Typically, the seal has a substantially circular solid portion 44 covering the convex surface 30 of the dam subassembly, and a rim portion 46 resting on the substantially cylindrical surface 32 of the dam subassembly. A supply line 48 for compressed air is provided for expanding the one or more inflatable seal tubes 36 against the nozzle wall. If desired, the steam generator side of the dam subassembly rim can include a circular flange 50 for trapping a circular trailing edge 126 of the seal 34 in interference engagement between the flange and the nozzle inner wall Conventionally, the dam unit 26 is installed entirely, or substantially entirely, by human entry through the manway 14 and the sequential passage into the manway and head region 12 of dam segments which are assembled by the technician in the nozzle region, while the technician kneels in the head region. In accordance with the present invention, a nozzle dam unit can be completely installed and removed remotely, i.e., without the need for a human to enter the steam generator head region.

Figure 3:
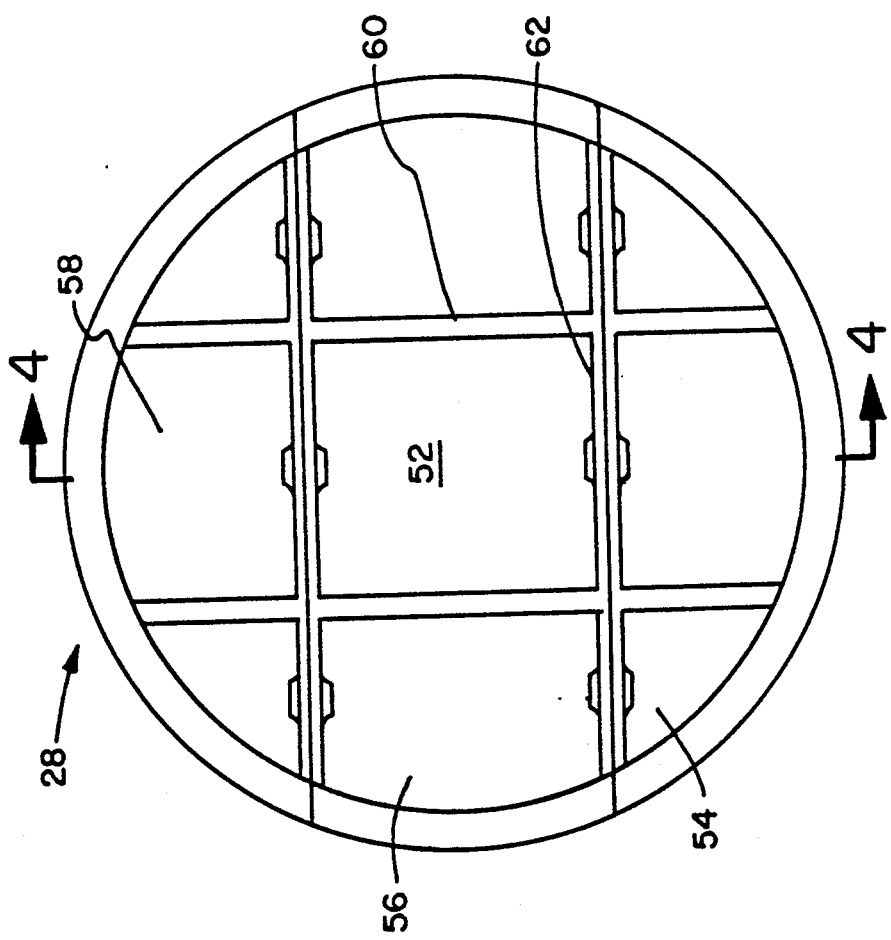
FIG. 3 is an elevation view of the concave side of the nozzle dam subassembly of FIG. 1, which faces the steam generator.

FIG. 3 shows schematically a nozzle dam subassembly 28 from the concave side 52, which consists of, in this instance, three separate segments 54, 56 and 58, each of which is small enough to pass through the manway 14, but which when assembled, form a bowl, or dome shaped plug or dam subassembly 28 having a diameter substantially equal to that of the nozzle at a preselected portion thereof.

FIG. 4 is a section view along lines 4—4 of FIG. 3 and shows that each of the segments 54, 56, 58 is somewhat cup-shaped when viewed in section, some of the walls 60, 62 of the cup formed by ribs or webb-like members projecting from the concave surface of the segments.

Figure 5:
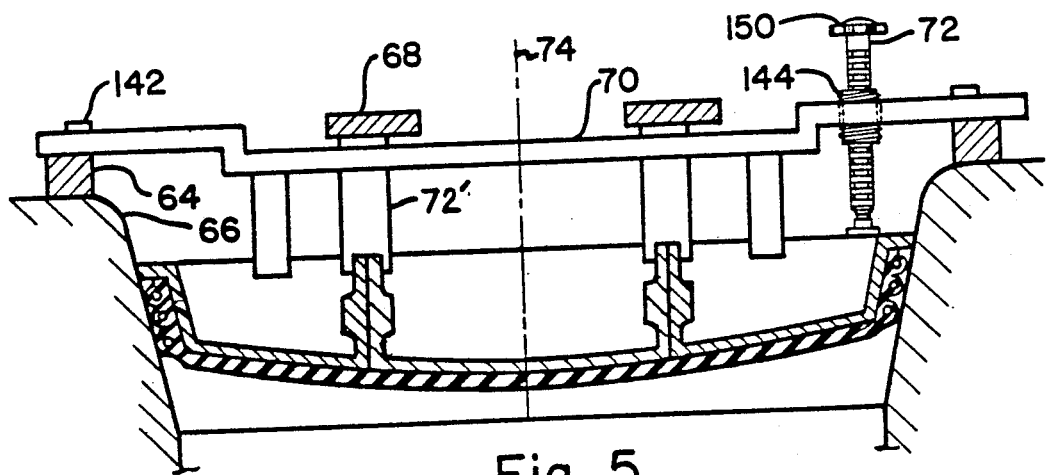
FIG. 5 is a side elevation view in section of the nozzle dam unit of FIG. 1.

FIG. 5 shows schematically a first embodiment of a nozzle dam unit 28 that can be installed remotely wherein the dam support structure 40 is adapted to seat against a bolt ring 64 that is a permanent part of the inner surface 42 of the head immediately surrounding the nozzle opening 66. The support structure includes a plurality of support bars 68, 70 oriented transversely to the nozzle axis 74, and a plurality of struts 72 or 72' which are substantially parallel to the nozzle axis. The strut may either be adjustable, as shown at 72, or fixed length, as shown at 72'. The struts transmit the substantially axial force imposed on the dam subassembly 28, to the support bars 68, 70, which in turn load the bolt ring 64 in tension and keep the dam subassembly 28 in position. Thus, the seal shown in FIG. 2 does not play a role in resisting the hydraulic load on the dam subassembly, but merely provides a fluid seal.

Figure 7:
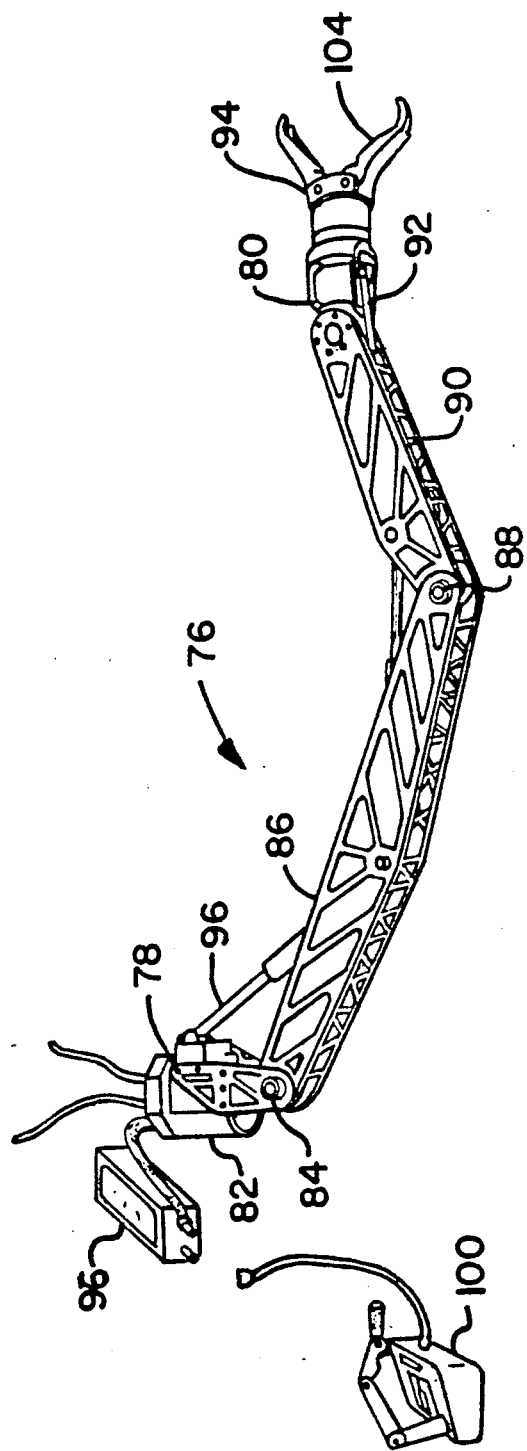
FIG. 7 is a schematic view of one type of manipulator suitable for remotely installing the nozzle dam unit shown in FIGS. 5 and 6.

To accomplish the objectives of the present invention, a manipulator 76, preferably the type shown in FIG. 7, is passed through the manway 14 and mounted at one end 78 in the steam generator head 12, leaving a free end 80 for performing the operations necessary to grasp the components of the nozzle dam unit at the manway 14, and assemble the components into a nozzle dam unit in the nozzle 16. The manipulator shown in FIG. 7 is available from Schilling Development, Inc., of Davis, Calif., and is identified as Titan 7F. The manipulator has seven degrees of motion, as follows:

(a) a base rotary actuator 82,
(b) a first pivot joint 84 for the upper arm 86,
(c) a second pivot joint 88 for the forearm 90,
(d) a pitch and yaw assembly 92, and
(e) a jaw assembly 94 or a similar clamping or grasping end effector and wrist rotator.

An associated servomechanism and electronics package 96, and master console 100 with cables is also provided commercially by the vendor. The vendor also provides hydraulic and inductive couplings as part of the jaw assembly.

Figure 8:
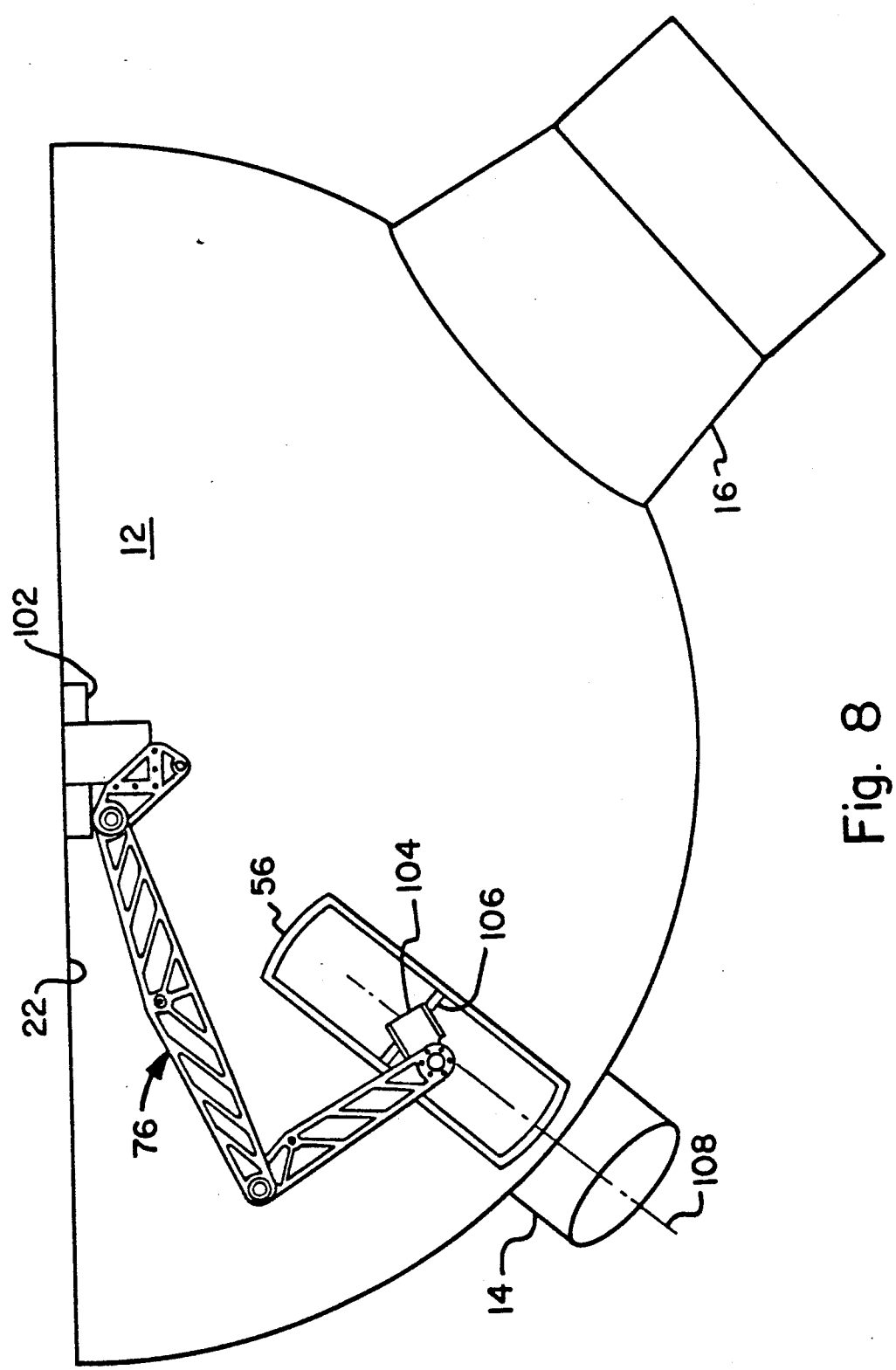
FIG. 8 is a schematic view of a portion of nuclear steam generator lower head after the manipulator has been installed on the tube sheet, and the central section of a nozzle dam has been passed through the manway and grasped by the manipulator.

The manipulator shown in FIG. 7 is preferably installed in the steam generator lower head in the configuration shown in FIG. 8. The base end 82 of the manipulator 76 can be fitted to a pedestal support structure 102 that is adapted to engage a plurality of tube ends 22 in the tube sheet 20, and thus rigidly support the base end 82. The connection of the pedestal 102 and base end 82 to the tube sheet 20 can be performed remotely by use of a block and tackle arrangement (not shown) or by a "bootstrap" technique whereby the manipulator 76 is inserted through the manway 14 and a bootstrap bar is secured relative to the manway. The jaw 104 is actuated to grasp the bootstrap bar and the manipulator is controlled so that the base end 82 moves relative to the stationary jaw and bootstrap bar, until the pedestal 102 is positioned over the selected tubes, and the base is locked in place. This locking can be achieved in a manner such as is shown in U.S. Pat. No. 4,018,346, which represents one of the variety of known techniques for locking servicing equipment into the tubes of a tube sheet. Another technique is to support the manipulator at least in part on the center column 24 shown in FIG. 1, where available.

Figure 6:
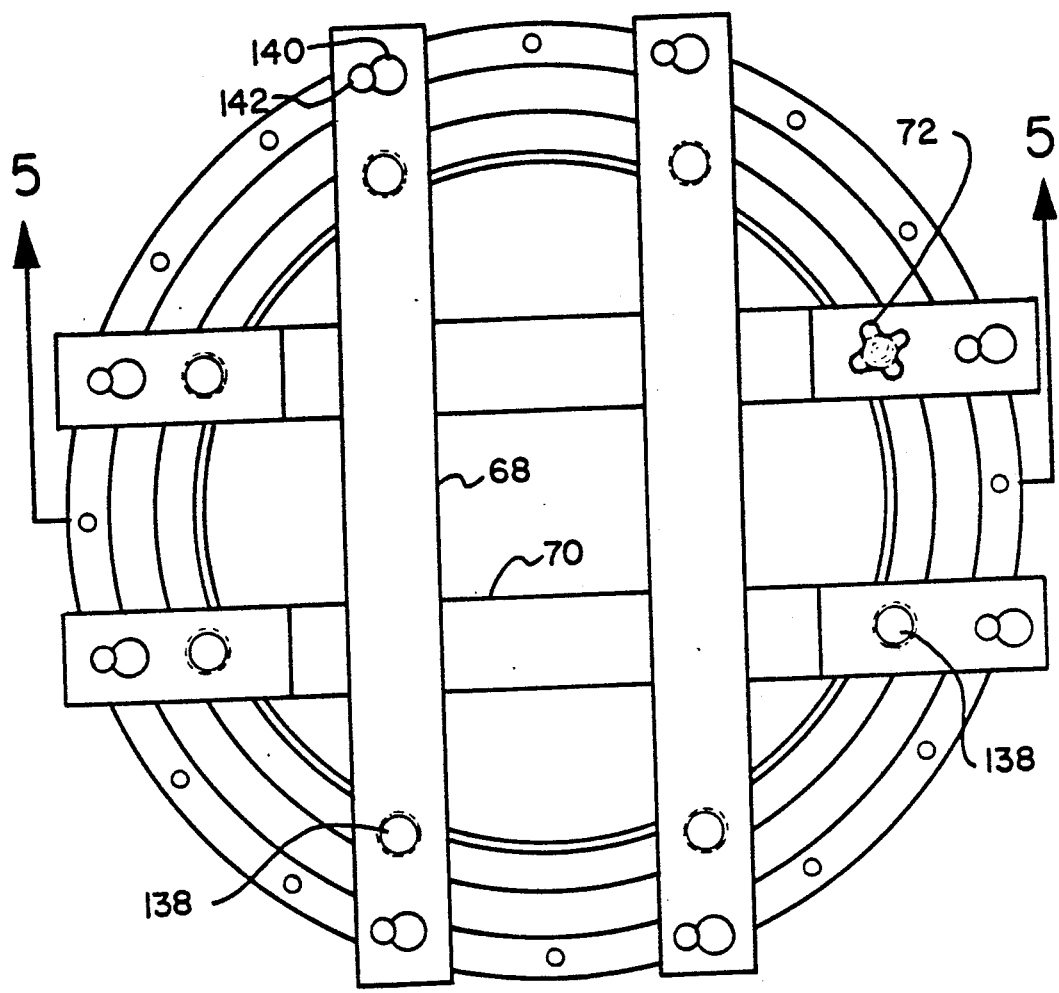
FIG. 6 is a elevation view of the installed nozzle dam unit of FIG. 1, as viewed from the steam generator head.

FIGS. 8-15 show the preferred sequence of operation of the manipulator 76 by the technicians who stand outside the manway 14, in order to remotely install the type of nozzle dam unit 26 shown in FIGS. 5 and 6. In this embodiment, the dam subassembly 28 has three segments although the invention can be implemented with a dam subassembly having two or more segments.

In FIG. 8, the first, central segment 56 is inserted through the manway 14 with the convex side 30 visible. The convex sided includes a control bar 106 which is grasped by the free end 80 of the manipulator as shown. The bar is preferably at the center of gravity of the center segment 56, and this center should also be identical to the center of gravity of the dam subassembly 28 shown in FIG. 3.

Figure 9:
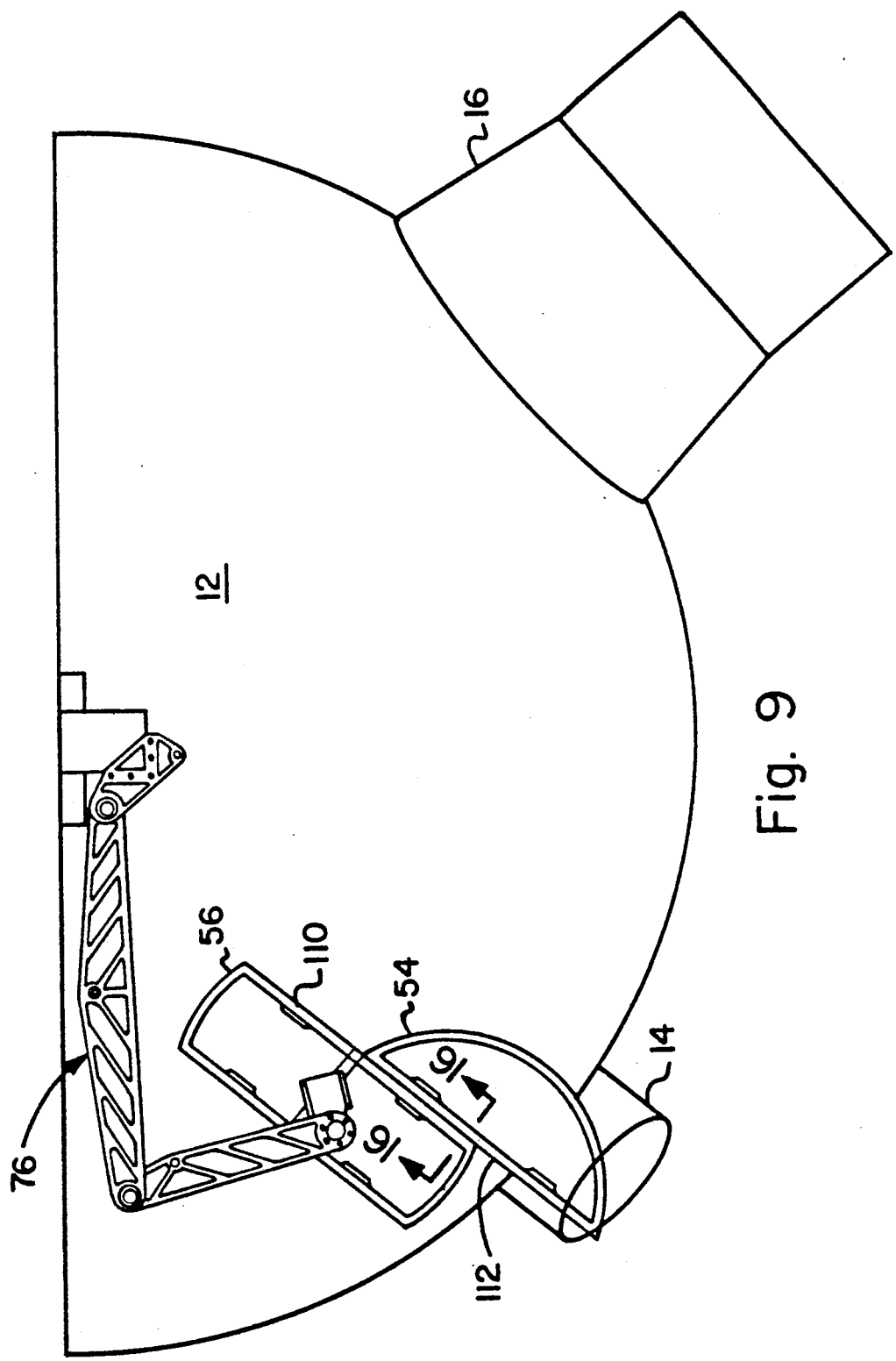
FIG. 9 shows a step subsequent to that represented in FIG. 8, whereby a second section of the nozzle dam is manually connected to the central section, in the vicinity of the manway.
Figure 16:
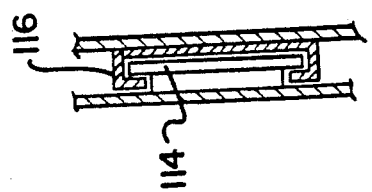
FIG. 16, is a section view along line 16—16 of FIG. 9, showing the preferred dovetail joint between the edges of adjacent nozzle dam section.

In FIG. 9, the manipulator has lifted the center segment 56 vertically, to one side of the axis 108 of the manway, such that a second segment 54 can be inserted into the head through the manway. The first and second segments have longitudinal edges 110, 112 which, in FIG. 9, are substantially parallel to the manway axis 108. These edges have respective male and female formations which permit a sliding, interference engagement between the segments 54, 56 which is effectuated as the technician advances the second segment through the manway. One suitable arrangement of the male and female formations 114, 116, is shown in FIG. 16. This arrangement is, in effect, a dovetail relationship extending over the full length of the mating edges 110, 112.

Figure 17:
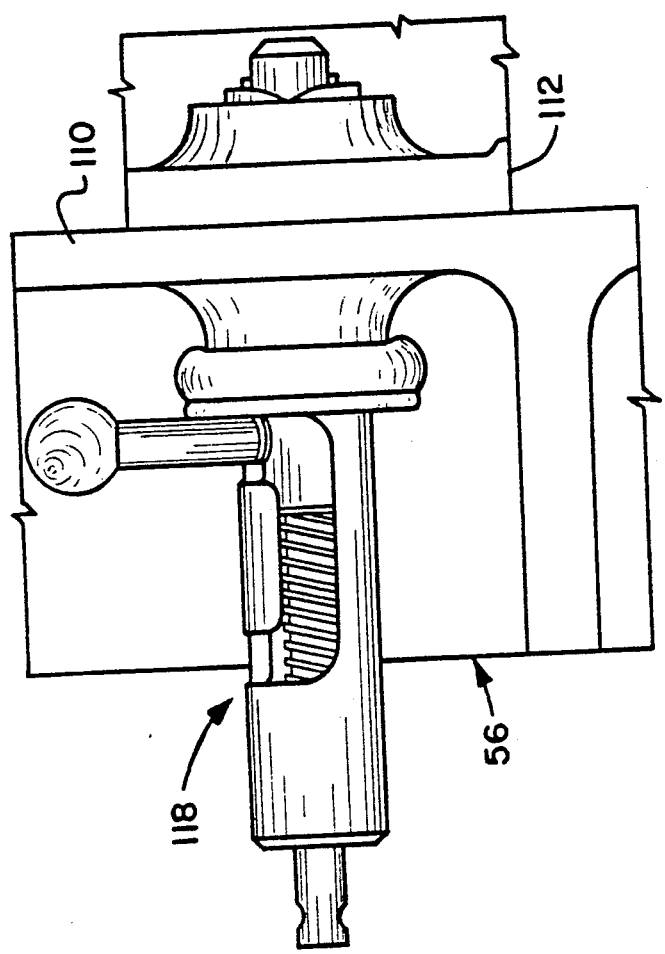
FIG. 17 is an elevation view of a spring loaded cam-lock that is suitable for use in locking together the dam sections.

When the first and second segments 56, 54 have been joined and are in proper registry, four locking bolts 118 carried by one or the other segment are actuated to lock the two segments together. One such bolt 118 is illustrated in FIG. 17, and is more fully described in U S. Pat. No. 4,744,392, "Nozzle Dam Segment Bolt and Keeper", the disclosure of which is hereby incorporated by reference. Although the bolt shown in FIG. 17 can be actuated in some instances by the technician's reaching through the manway, the bolts are preferably fitted with hydraulic or pneumatic actuators which can be controlled through pneumatic or hydraulic lines and connections associated with the manipulator and an external control systems (See FIG. 25).

Figure 10:
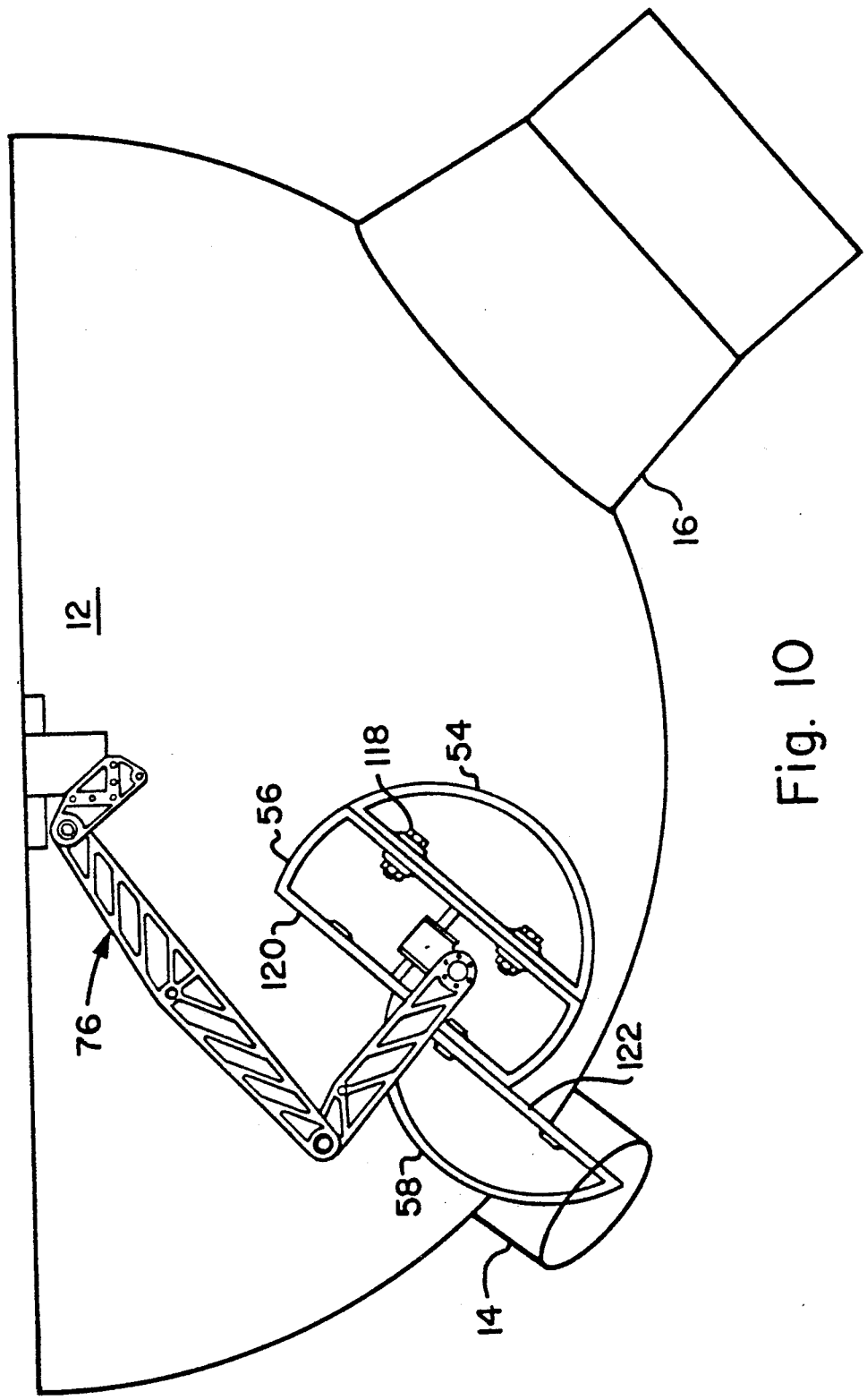
FIG. 10 is a schematic view of a step subsequent that represented in FIG. 9 wherein a third section the nozzle dam is secured to the central section in the vicinity of the manway.

FIG. 10 shows that after the first 56 and second 54 segments have been locked together, the manipulator 76 is controlled so that the center segment 56 and connected second segment are lowered to the other side of the manway axis 108. The center segment 56 has another longitudinal edge 120 parallel to the manway axis, for mating with a longitudinal edge 122 on the third segment 58, which is passed through the manway and locked to the first segment 56 in the same manner as was described with respect to FIG. 9. As will be described more fully below, the seal member 34 is then secured to the subassembly 28 to form the dam assembly 124.

Figure 11:
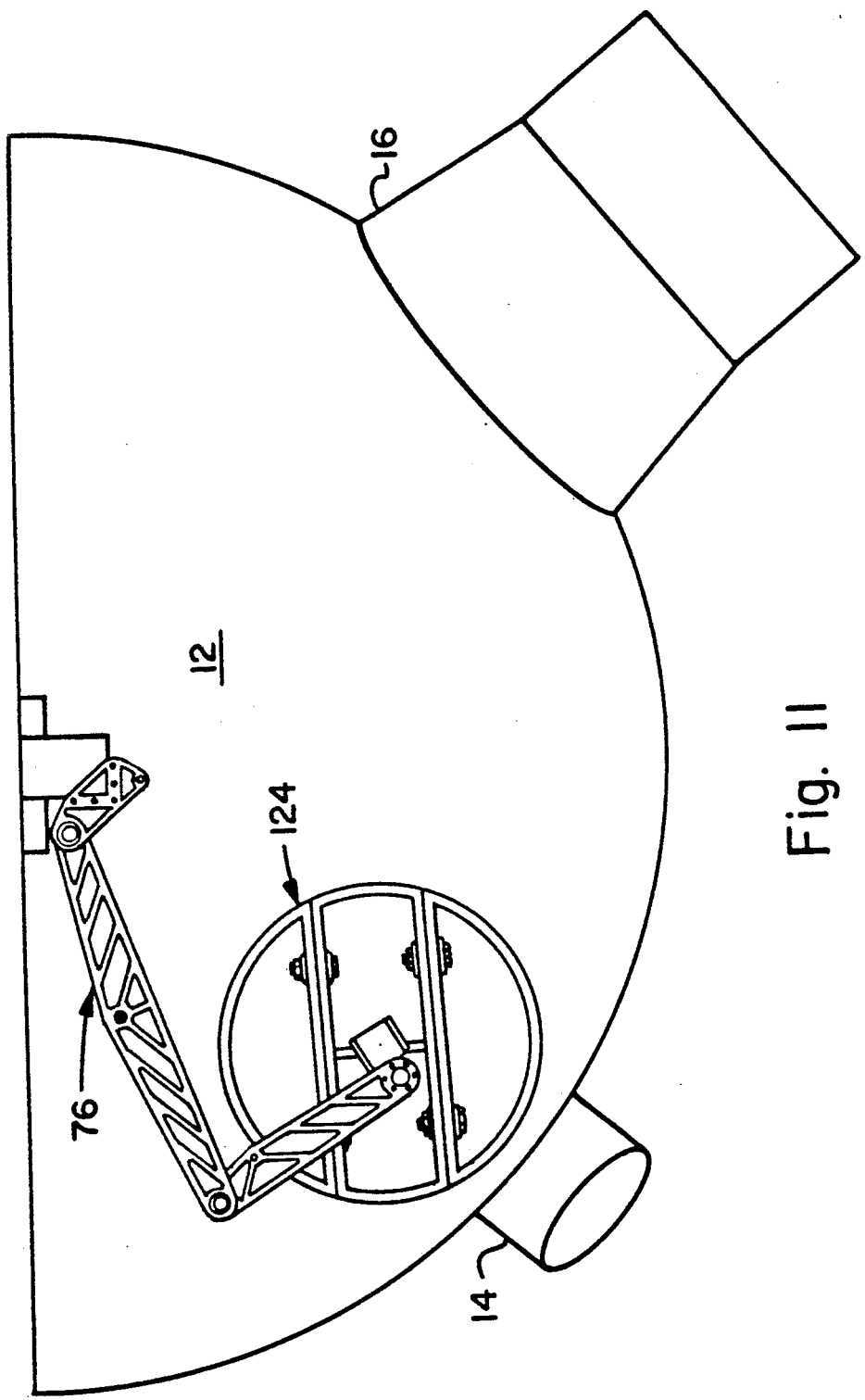
FIG. 11 is a schematic view of the rotation of the dam subassembly in the vicinity of the manway, preparatory to displacement toward the nozzle.
Figure 12:
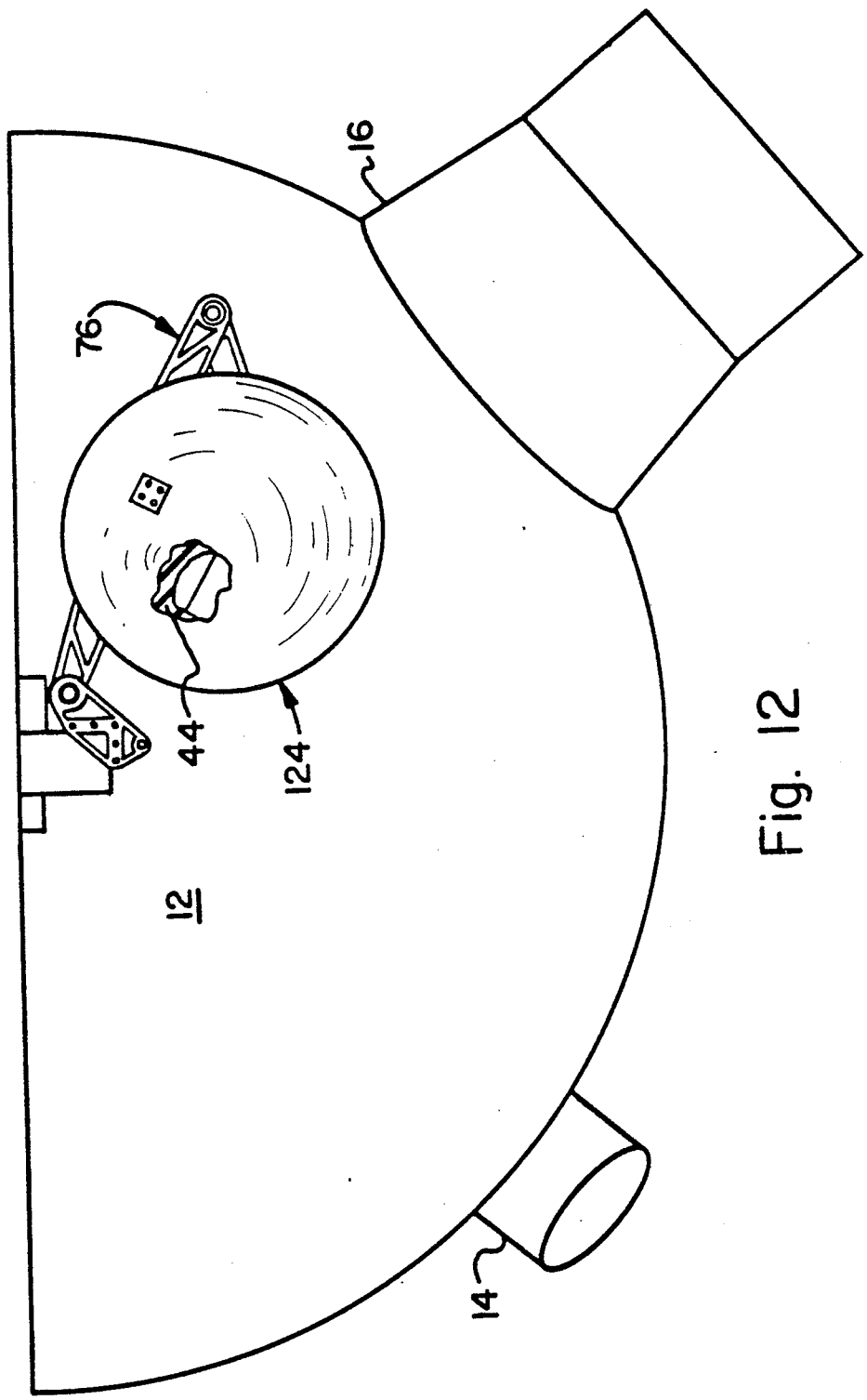
FIG. 12 is a schematic view of the position of the manipulator and the dam subassembly in the vicinity of the nozzle.
Figure 13:
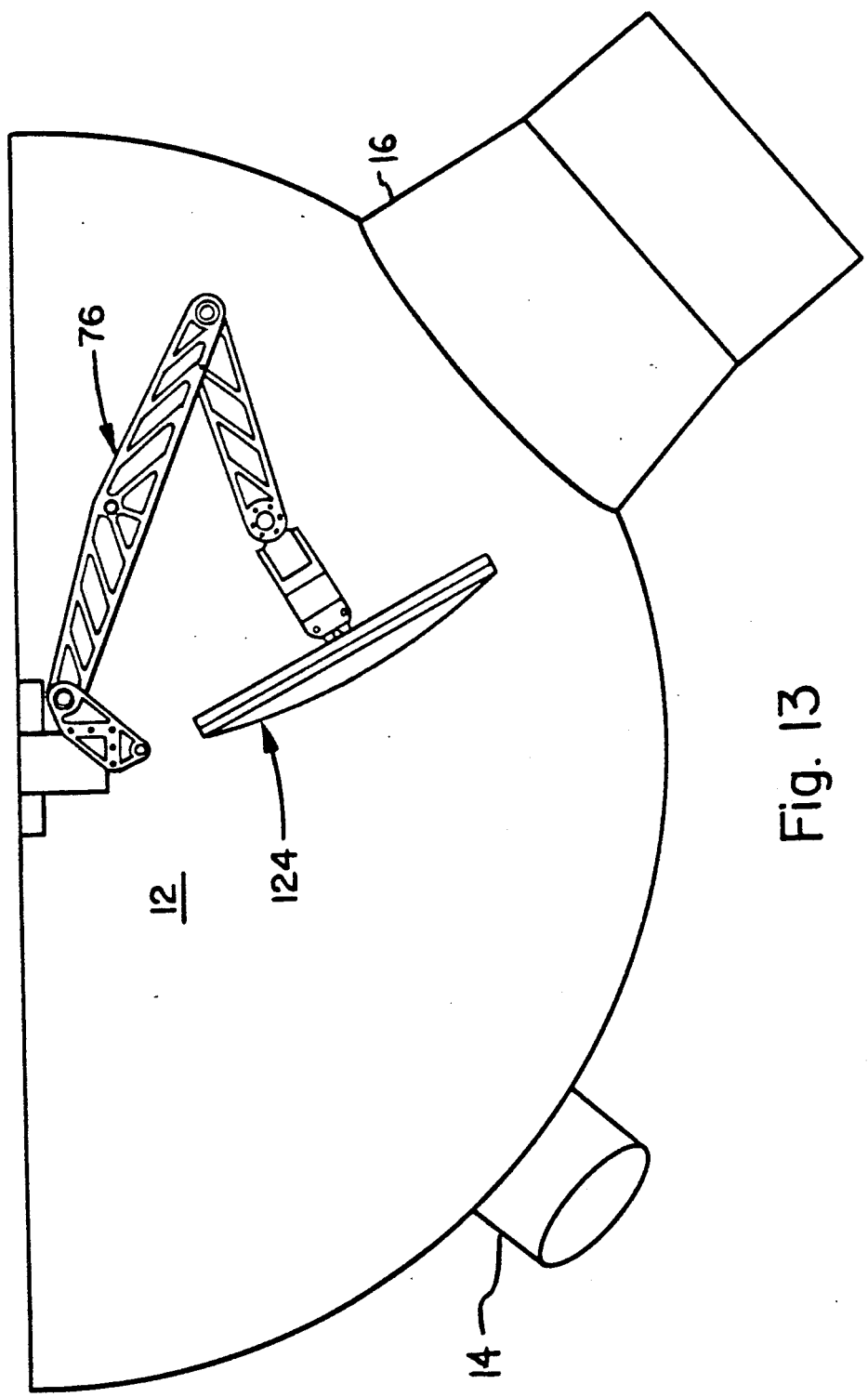
FIG. 13 is a schematic view of the position of the manipulator and the nozzle dam assembly prior to insertion into the nozzle.
Figure 14:
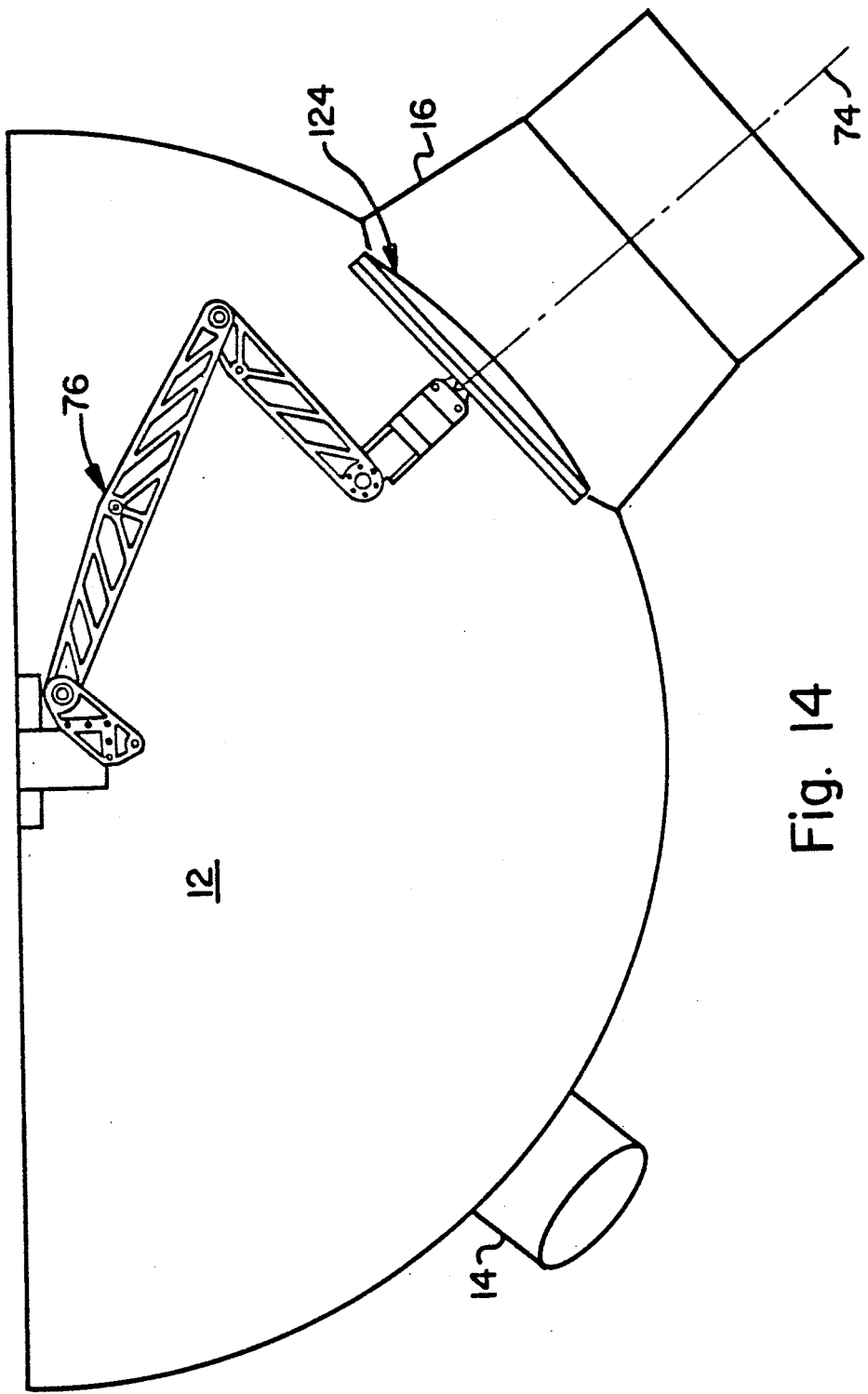
FIG. 14 is a schematic view of the position of the manipulator and dam as dam assembly as the latter is inserted into the nozzle.

As shown in FIGS. 11 and 12, the manipulator 76 is then controlled to displace the completely formed dam assembly 124 from the vicinity of the manway 14 to the vicinity of the nozzle 16, in a manner which has the effect of rotating the assembly 180° as viewed in the drawings so that the convex side 30 carrying the seal face 44 is visible. The manipulator forearm 90 and wrist 92 are further controlled as shown in FIGS. 13 and 14 until the convex side 30 of the assembly 124 is positioned in the opening 66 of the nozzle whereupon the assembly 124 is advanced along the nozzle axis 74 to the seated position shown in FIG. 15.

Figure 15:
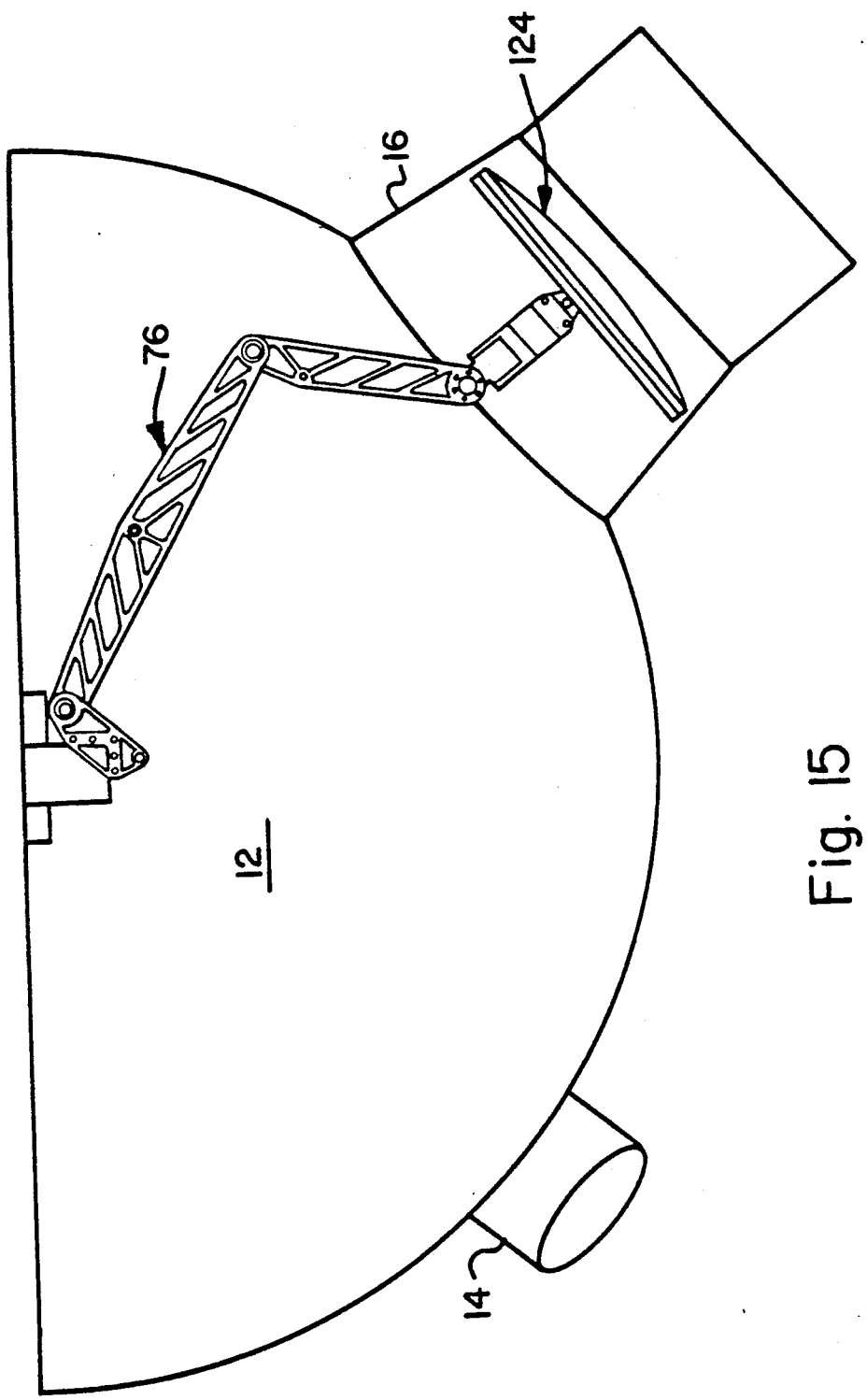
FIG. 15 is a schematic view of the position of the manipulator and dam assembly as the latter is seated in the nozzle.

It should be appreciated that preferably, the seal member 34 should be substantially in place on the dam assembly before the assembly is transported from the position shown in FIG. 11 to the position shown in FIG. 15. FIG. 12 shows a front view of the dam assembly, on the dome side, with the circular portion 44 of the seal facing the viewer Preferably, the seal member 34 is secured to the third segment 58 and folded thereon into a ball or the like with Velcro straps or similar binding before the third segment is passed through the manway as shown in FIG. 10. When the dam subassembly 28 is fully formed as shown in FIG. 11, the straps are manually released with a pull and the seal opens fully.

As shown in FIGS. 2 and 18, the trailing edge 126 of the seal may have a plurality of stainless steel loops 128 extending therefrom and the flange 50 or trailing surface of each segment has a hook 130 or the like such that the technician can, while the subassembly is in the position shown in FIG. 11, pull the loops 128 over the corresponding hooks 130 at a plurality of locations, thereby properly fitting the seal member 34 on the dam subassembly 28.

Alternatively, as shown in FIGS. 19 and 20, the base of the rim portion of the inflatable seals can have a plurality of tab extensions 132 which fit through respective openings 134 in the flanged portions of the dam subassembly and the technician can slide a locking pin 136 through a hole in each tab extension.

With the seal in place while the dam assembly is in position shown in FIG. 11, the subsequent control of the manipulator to the position shown in FIG. 15 results in substantially circumferential contact of the flexible, tubular seals 36 with at least some of the nozzle inner wall 38, i.e., within the nozzle.

The manipulator jaw 104 is then released from the control bar 106 and returned to the manway 14 where the technician sequentially feeds the jaw with, for example, four dam support bars 68, 70 which are attached to the bolt ring 64 in, for example, the relationship shown in FIGS. 5 and 6. Each support bar preferably carries a pair of adjustable strut members 72 at the locations indicated at 138, for the purpose of transmitting the hydraulic loads from the dam assembly 124 to the bolt ring 64. The support bars 68, 70 can be secured to the bolt ring by means of respective key ways 140 and key bolts 142.

The strut members 72 can take a variety of forms, one of which is shown in FIG. 21. This is a quick acting screw clamp available from the Carr Lane Manufacturing Co., St. Louis, Mo. under the name Barlock. This clamp has a sleeve 144 that is mounted in the support bar 68 or 70, and a screw portion 146 adapted to permit rapid linear advance of the screw through the sleeve until the foot 148 contacts the dam assembly 124, whereupon a twist of the handle 150 tightens the screw 146 to take up any clearances and produce a rigid overall nozzle dam unit 26. If a non-adjustable strut 72' is employed, a groove at the leading end of the strut fits over two adjacent walls 62 and wall 60.

Figure 24:
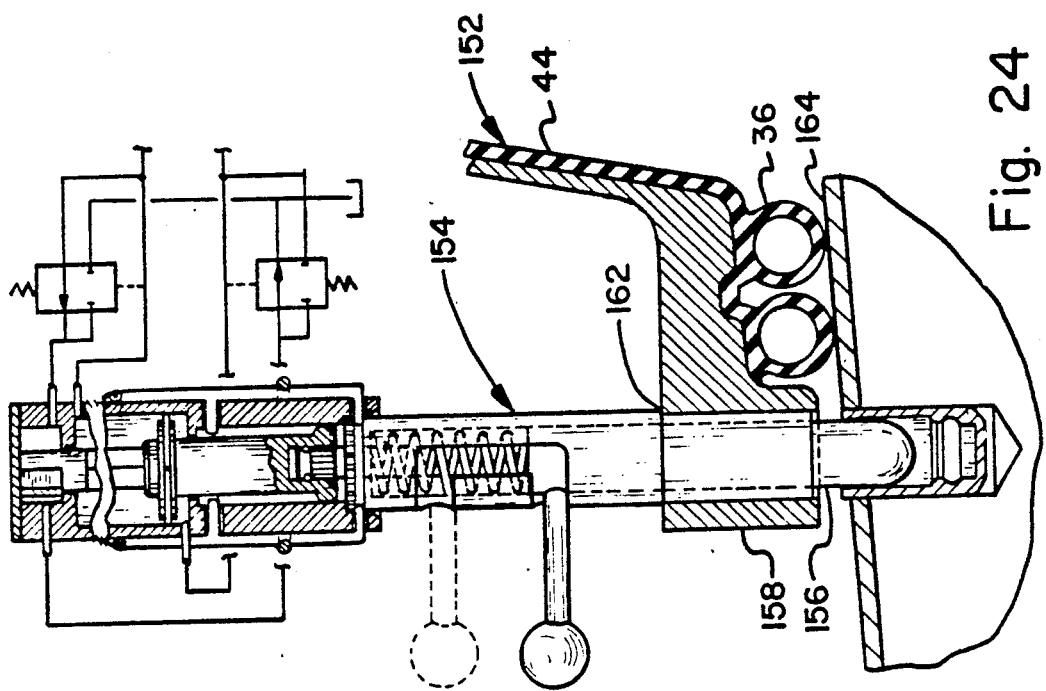
FIG. 24 is a schematic of a suitable quick acting locking pin for use in radially securing the dam assembly of FIGS. 22 and 23, into the inner wall of a nozzle.
Figure 22:
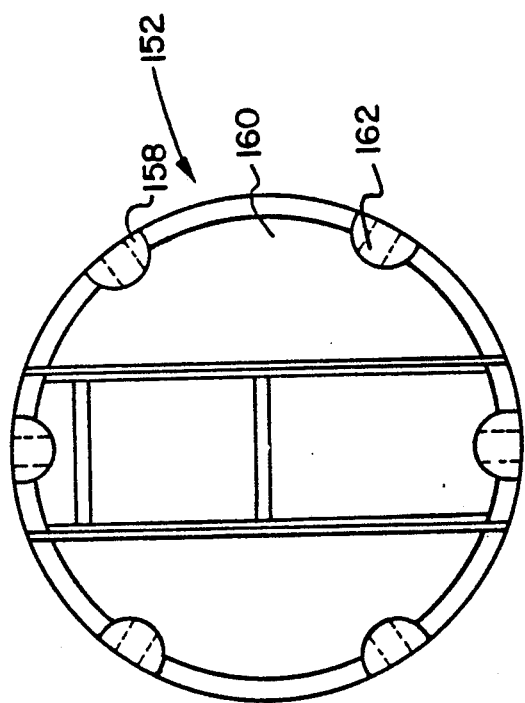
FIG. 22 is a schematic view of the concave side of a second embodiment of the dam subassembly.
Figure 23:
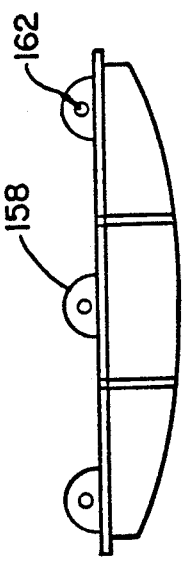
FIG. 23 is a side view of the dam subassembly of FIG. 22.

The present invention can be implemented with other types of nozzle dam units, such as described in U.S. Pat. No. 4,482,076, "Nozzle Plug For Submersible Vessel", the disclosure of which is hereby incorporated by reference. With this alternative nozzle dam unit 152, shown in FIGS. 22, 23 and 24, the support structure 154 includes a plurality of locking pins 156 which are carried in a respective plurality of bosses 158 on the circumferential periphery at the steam generator side 160 of the dam assembly. The pins 156 are adapted to extend radially into a corresponding plurality of holes 162 predrilled in the inner wall 164 of the nozzle. FIG. 24 shows one such pin member 156, which is described more fully in U.S. Pat. No. 4,770,235, "Nozzle Dam Locking Pin Assembly", the disclosure of which is hereby incorporated by reference. The actuation of these preloaded pins can be controlled through hydraulic connectors associated with the jaw means of the manipulator (See FIG. 25).

FIG. 25 is a block diagram schematic of the auxiliary equipment associated with a complete system in accordance with the preferred embodiment. The manipulator is shown having a pedestal section 102 of the rotatable base 82 for attachment to the tube sheet 20. The arm 168 is shown in alignment with the nozzle dam assembly, to illustrate that the wrist or jaw assembly 94 may have associated therewith, pneumatic or hydraulic couplings 170, 172 for direct engagement with respective mating connectors 174, 176 carried by the nozzle dam assembly 124. A video camera 178, preferably connected to the manipulator 76, or optionally, the tube sheet 20, may also be articulated at 180 for optimum orientation. These structures are all enclosed within the box 182 shown in broken lines, to indicate that they are within the steam generator head 12 during use of the system.

The manipulator 76 is controlled from outside the steam generator by means of a master console 100 and associated hydraulic and pneumatic servo mechanisms 96 which have respective lines 184 to control the various articulated joints. The operator controls the articulated master arm 186 on the control console 100, and the movements thereof are precisely reproduced, in scale, at the slave manipulator and jaw. This capability is conventionally available with the Titan 7F manipulator from Schilling Development, Inc., and other vendors.

The pedestal 102 has a similar, but much simpler control system, by which a plurality of fingers 188 project from the pedestal and, at the appropriate time, are expanded into the selected tubes of the tube sheet, when an operator throws switches or the like at the interface 190, thereby hydraulically or pneumatically delivering, through actuator box 192, a flow or pressure through line 194.

A video monitor 196 and a video position controller 198 are respectively connected to the video camera and the positioning servo 200 associated therewith.

Another interface 202, in the form of switches or the like, is similarly connected to a hydraulic or pneumatic actuator box 204, for actuating locking bolts 136 or pins 156, or the like on the nozzle dam assembly 152 through the couplings 170, 172, 174, 176 at the manipulator wrist The interface 202 and hydraulic and pneumatic actuator box 204 could be integrated with the main manipulator control system 180, 182, 184.

Finally, an independent source 206 of pneumatic pressure and, if desired, a leak detection line 208, are connected to the seal portion 34 of the dam assembly, in a manner shown in, for example, FIG. 2, and in U.S. Pat. No. 4,482,076.

After the dam has been installed as a dam unit 26 in the nozzle 16, the manipulator 76 would typically be dismounted and removed from the head region 12 so that inspection, repair and other operations can be performed unimpeded The lines 48, 208 to the nozzle dam unit 26 would, however, be maintained continuously, for safety and monitoring purposes.

It should thus be appreciated that the method and system described herein are well adapted to accomplish the objective of remotely installing and removing a nozzle dam. Variations of the particular components and equipment described herein may be substituted without departing from the scope of the invention as set forth in the claims.

We claim:

1. A system for installing a nozzle dam in a nuclear steam generator having a head including a head internal surface, a manway penetrating the head, and a nozzle penetrating the head, the system comprising:
   a manipulator adapted to be passed through the manway and having one end adapted to be attached remotely to the head internal surface and a free end including a clamp member;
   a plurality of nozzle dam segments, each segment sized to pass through the manway and having means thereon for engaging at least one other segment, the segments when fully engaged to each other forming a dam subassembly sized to pass into and seat against the nozzle; and
   means for controlling the manipulator while said one end is attached to the head internal surface, such that the clamp member grasps and supports one of the dam segments within the head until the subassembly is formed within the head, and then translates the dam subassembly within the head until the dam subassembly seats within the nozzle.

2. The system of claim 1, wherein the dam subassembly has a circular perimeter and the means for engaging at least one other segment includes a male formation on one segment adapted to slide within a female formation on the other segment, in a direction parallel to the subassembly diameter.

3. A system for the installation of a nozzle dam in a nuclear steam generator having a head, a manway penetrating the head, and a nozzle penetrating the head, the system comprising:
   a manipulator adapted to enter the manway and having one end adapted to be attached to the head and a free end including a clamp member;
   a plurality of nozzle dam segments, each segment sized to pass through the manway and having means thereon for engaging at least one other segment, the segments when fully engaged to each other forming a dam subassembly sized to seat against the nozzle; and
   means for controlling the manipulator while said one end is attached to the head, such that the clamp member grasps and supports one of the dam segments within the head until the subassembly is formed within the head, and then translates the dam subassembly within the head until the dam subassembly seats against the nozzle.

4. A system for the installation of a nozzle dam unit in a nuclear steam generator having a head, a manway penetrating the head, a nozzle penetrating the head, and a dam support surface within the head in the vicinity of the nozzle penetration, the system comprising:
   a manipulator adapted to enter the head through the manway, said manipulator having a free end including a clamp member adapted for articulated movement within the head;
   a plurality of nozzle dam segments, each segment sized to pass through the manway;
   means for connecting the segments to each other so that the segments when fully connected to each other form a dam subassembly adapted to seat against the nozzle;
   brace means sized to pass through the manway and engageable with the dam subassembly and the dam unit support surface; and
   means for controlling the manipulator free end in the head to assemble the segments and brace means as a nozzle dam unit that is braced against the support surface with the dam subassembly seated against the nozzle.

5. The system of claim 3, wherein the subassembly has a substantially circular perimeter and the dam unit includes a seal member on the subassembly perimeter for sealing the seated subassembly against the nozzle.

6. The system of claim 3, wherein the dam support surface surrounds the nozzle penetration within the head and the brace means include a plurality of bars for engaging said dam support surface.

7. The system of claim 3, wherein the dam support surface is located within the nozzle and the brace means includes a plurality of pins projecting radially from the dam subassembly for engaging said dam support surface.

* * * * *